July 15, 1958  K. M. FEIERTAG ET AL  2,843,771
DYNAMOELECTRIC MACHINE
Filed April 27, 1956
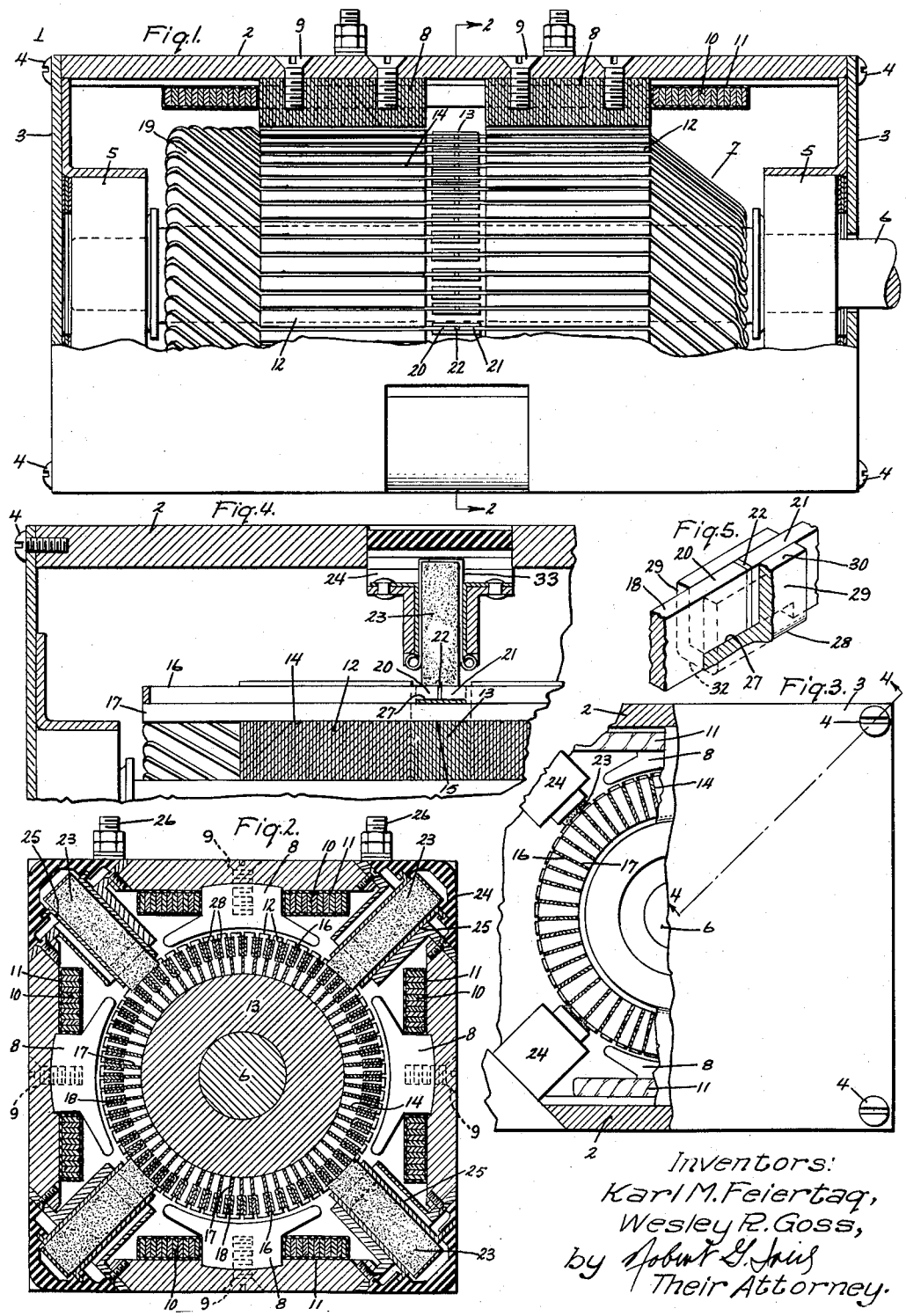
Inventors:
Karl M. Feiertag,
Wesley R. Goss,
by *Robert G. [signature]*
Their Attorney.

United States Patent Office 2,843,771
Patented July 15, 1958

2,843,771

DYNAMOELECTRIC MACHINE

Karl M. Feiertag and Wesley R. Goss, Fort Wayne, Ind., assignors to General Electric Company, a corporation of New York Application April 27, 1956, Serial No. 581,169

11 Claims. (Cl. 310—236)

This invention relates to dynamoelectric machines, and more particularly to the type of dynamoelectric machine having a rotatable armature with a winding energized through brushes.

There are many types of dynamoelectric machines primarily those intended to be supplied with direct current power, which operate by commutation of the current through the armature winding in such a predetermined sequence as to cause rotation of the armature. In motors of this type, it has generally been found necessary, in the past, to provide an entirely separate member called a commutator to effect the commutation for the armature coils. The most practical method was found to be to place the commutator adjacent the armature and axially aligned with it, the commutator having its surface made up of electrically separate conductive elements suitably connected to the armature coils. Power is supplied in the usual manner through brushes, generally of carbon, arranged to contact the surface of the conductive elements as the commutator rotates. The extreme precision required for the manufacture of a commutator and the high number of parts involved make a commutator a relatively expensive part of the motor. It is most desirable to obtain the commutation effect briefly described hereabove without the expense which has always accompanied it. In addition, it is most desirable to obtain commutation while eliminating the additional commutator member axially arranged with the armature, thereby effecting a substantial shortening of the motor length.

It is, therefore, an object of this invention to provide an electric motor having an improved armature construction suitable for effecting commutation and for obtaining the desirable features set forth above.

In its broader aspect, the invention provides a motor having an armature in the form of a cylindrical rotatable member with substantially axially extending slots formed adjacent its surface. A winding is arranged in the slots, and the member is arranged with a section which has a decreased radius for a predetermined axial length and which is positioned intermediate the end of the armature. This decreased radius causes at least the outer surfaces of the winding to be positioned radially beyond the member for the predetermined length. The winding surfaces are formed substantially flat over the predetermined length so that they are thereby suitable for commutation purposes.

In this manner, the additional separate commutation member is eliminated since commutation is effected within the axial length of the armature itself. The accuracy required in the positioning of the commutating surfaces is obtained because the surfaces are formed on members which are each secured within slots on each side of the commutating length so that there is little possibility of deformation and flexing.

In a further improvement provided by the invention, the effective area of each commutating element is increased by arranging a substantially U-shaped clip member about each radially outer coil in the armature section with the decreased radius. The member is then made integral with the coil, as by brazing, for instance, so that the top of each leg of the U-shaped clip and the coil form an integral commutating surface considerably larger than that provided by the coil itself. The U-shaped clip provides a further advantage by increasing the cross sectional area of the conductor at the commutating section. Since this area is decreased both by wear during operation and by machining to restore a smooth surface after a predetermined amount of operation, it normally would soon be reduced below that of the remainder of the axial length of the conductors, and thus would become an undesirable limiting factor. The U-shaped clip ensures an adequate cross sectional area in the commutating section of each conductor despite wear and machining operations.

The features of the invention which are believed to be novel are set forth with particularity in the appended claims. The invention itself, however, together with further objects and advantages thereof, may best be understood by reference to the following description taken in connection with the accompanying drawing.

In the drawing,

Figure 1 is a side view, partly broken away and partly in cross section, of an electric motor including the improved construction of this invention;

Figure 2 is a view along line 2—2 in Figure 1;

Figure 3 is an end view of the improved motor, partly cut away and partly in cross section;

Figure 4 is a fragmentary view in cross section along line 4—4 in Figure 3; and

Figure 5 is an enlarged fragmentary view in perspective of part of an armature coil.

Referring now to the figures of the drawing, there is shown an electric motor, generally indicated at 1, having a tubular yoke portion 2 of magnetic material which also serves as a shell member and which, together with end shields 3 serves to enclose the remainder of the motor to be described. The end shields 3 may be secured to yoke member 2 by any desired means such as, for instance, bolts 4. Each of the end shields is arranged to support a bearing structure generally indicated at 5, and a shaft 6 is rotatably mounted in the bearings 5. Shaft 6 forms part of an armature member, generally indicated at 7, which will be further described herebelow and which is ordinarily mounted in rotatable relation to a plurality of circumferentially spaced pole pieces 8 of magnetic material. Each pole piece is secured to yoke 2 by any desired means such as, for instance, screws 9. As shown, each of the pole pieces 8 may be made up of two axially separated portions, if so desired. A coil 10, which may be provided with insulation 11, is positioned about each pole piece; poles 8 and coils 10 are suitably formed in the standard manner so that alternate poles have opposite polarities when the coils are energized through a source of power (not shown).

Armature 7 includes two axial separated groups of stacked laminations of magnetic material 12, and a third group of stacked laminations of magnetic material 13 arranged to form a section between the two groups 12 of lesser radius for a purpose which will appear herebelow. Armature sections 12 have axially extending slots 14 with suitable bar conductors 16 and 17 arranged therein to form coils, with conductor 17 in the bottom of each slot and conductor 16 being arranged directly radially thereon. Such bar conductors are particularly desirable in low-voltage direct-current applications, and are extensively used in dynamoelectric machines of that type. Thus, the present invention is particularly applicable to such machines;

however, the invention has a possible field of application in any dynamoelectric machine using brushes and is not to be considered limited only to low-voltage direct-current machines. Conductors 16 and 17 are of rectangular bar stock; generally of copper, arranged so that conductor 16 presents a substantially flat outer surface 18. As can best be seen in Figure 1, the conductors 16 and 17 are bent over as shown at 19 and back into a different slot so as to form coils of a winding in substantially the usual manner.

In the forming of the winding and the arrangement of the conductors 16 and 17 in each slot 14, it has been found preferable to form the winding of relatively short lengths of conductor stock which extend only between two slots, and to join the abutting ends of two lengths within the same slot. Thus, referring to Figure 5, the numerals 20 and 21 denote the ends of separate lengths of stock which have been placed in the same slot so that the two ends of the two parts 20 and 21 are in abutment, as shown. The two adjacent ends are integrally joined at 22 by suitable means, such as, for instance, brazing where the parts are of copper. In this manner, a plurality of easily assembled short lengths of stock may be formed into the coils of a single complete uninterrupted winding in the slots 14 of armature 7. For reasons which will be more fully set forth below, it is desirable that the joining of the ends of separate lengths 20 and 21 be effected in each case in the predetermined axial section of armature 7 made up of the group 13 of laminations of decreased radius as shown in Figure 1.

As explained before, it is necessary to provide suitable commutation of the flow of current through the armature winding. In the present invention, no separate commutator is provided; instead, section 13 of the armature is formed of laminations of a radius such that at least the outer surface of the winding 16 extends radially beyond the section for the axial length thereof. As shown in the figures, the radius of section 13 may be made such that it comes only to the bottom of the slots 14 to provide radial support for conductors 17, thus making it possible for the laminations of which the section is formed to be made up in a simple annulus form. It is even conceivable that the laminations of section 13 of the armature might be dispensed with entirely, within the meaning of this invention, since they serve practically no useful purpose insofar as dynamoelectric force is concerned. However, in order to provide a rigid support under the conductors 16 and 17, the preferred embodiment of the invention provides a section 13 having a radius at least as shown, that is, which serves as a radial support for the two conductors 16 and 17 of each slot 14.

The radially outer surface 18 of each outer conductor 16 is formed to act as an element of a commutator within the axial length of section 13, that is, it is suitably finished and smoothed in the usual well-known manner. The necessary rigidity to avoid excessive wear is provided by the fact that only a relatively short axial length of the armature is constituted by section 13; suitable support is provided on each side thereof because of the fact that the windings rest on each other and are supported within the slots 14. In the preferred embodiment shown, additional support is provided by the fact that section 13 serves as a support for the winding 17.

Once each surface 18 has been finished, in accordance with the description above, conductors 16 are then ready, as a group, to serve additionally as a commutator and to be arranged in engageable relation with the brushes 23 of brush mechanisms generally indicated at 24. As shown best in Figures 2 and 4, these brush mechanisms may advantageously be arranged at the corners of the square housing 2 between the poles 8. However, it will be understood that the invention is in no way restricted to a motor having a square housing or to the particular arrangement of brushes shown, and that any arrangement whereby brushes are made to engage with a commutator formed integrally with the armature as set forth above is within the scope of the invention. To describe the brushes briefly, each brush 23 is formed of a conductive material (generally some type of carbon alloy) which is in electrical contact with a metallic guide member 25 which in turn is connected to one of two terminals 26 by any desired means (not shown) so as to provide power across the armature winding. Proper electrical engagement of each brush member 23 with the surfaces 18 may be insured by any suitable biasing means such as a spring 33.

The arrangement described above provides a most satisfactory commutator construction integral with the armature and contained within the axial length thereof. It will be seen, however, that the area of the commutating surface of each conductor 16 is relatively small and that, consequently, high current densities may occur. In order to provide an area for each commutating element more consonant with that obtained in the past with separate commutator members, the arrangement described herebelow is preferably provided. The abutting ends of lengths 20 and 21 which form the conductor 16 in each slot 14 are notched as shown at 27. A U-shaped clip member, formed from the same material as the conductor 16, generally indicated at 28, is arranged to extend around the notched portion 27 of conductor 16 so that its legs 29 extend on each side of the conductor with the top surfaces 30 of the legs being in the same plane as surface 18 and forming extensions thereof. In addition, the bight 31 of the clip 28 extends through the notched portion 27 so that the bottom 32 of the clip is flush with the bottom of conductor 16 and rests on the top of conductor 17. With the parts so arranged, clip 28 is integrally joined to conductor 16 by suitable means such as brazing where the clip and conductor are of copper, as will generally be the case. This may be advantageously effected in the same operation which joins the two lengths 20 and 21; thus, one operation provides the whole assembly, and surfaces 30 and 17 can be prepared as a unitary commutator element. Where, as is one possibility, clip 28 is made of the same thickness as the stock from which conductors 16 and 17 are formed, the area of the commutator element is tripled and thus the current density is correspondingly decreased. In addition to this desirable function of increasing the commutator area, the clip, since it is preferably located where the ends of lengths 20 and 21 are joined, serves to strengthen the junction of these parts.

While the invention has been explained by describing a particular embodiment thereof, it will be apparent that improvements and modifications may be made without departing from the scope of the invention as defined in the appended claims.

What we claim as new and desire to secure by Letters Patent of the United States is:

1. In a dynamoelectric machine, a cylindrical rotatable armature member having substantially axially extending slots formed adjacent its surface, a winding arranged in said slots, said member being arranged to have a section of decreased radius for a predetermined axial length intermediate its ends so that at least the outer surface of said winding is radially beyond said member for said predetermined length, said winding surface being formed substantially flat for said predetermined length whereby it is suitable for commutation purposes.

2. In a dynamoelectric machine, a cylindrical rotatable armature member having substantially axially extending slots formed adjacent its surface, coils supported in said slots and formed respectively of conductors of substantially rectangular bar stock, said member being arranged to have a section of decreased radius for a predetermined axial length intermediate its ends so that at least the outer surfaces of said conductors are radially beyond said member for said predetermined length, said surfaces being formed substantially flat for said predetermined length whereby they are suitable for commutation purposes.

3. In a dynamoelectric machine, a cylindrical rotatable armature member having substantially axially extending slots formed adjacent its surface, coils supported in said slots and formed respectively of radially superimposed conductors of substantially rectangular bar stock, said member being arranged to have a section of decreased radius for a predetermined axial length intermediate its ends so that at least the outer surfaces of the outer conductors are radially beyond said member for said predetermined length, said surfaces being formed substantially flat for said predetermined length whereby they are suitable for commutation purposes.

4. In a dynamoelectric machine, a cylindrical rotatable armature member having substantially axially extending slots formed adjacent its surface, coils supported in said slots and formed respectively of radially superimposed conductors of bar stock, said member being arranged to have a section of decreased radius for a predetermined axial length intermediate its ends substantially equal to the radius of the bottoms of said slots thereby to provide support for said conductors intermediate said slots, the outer surfaces of the outer conductors being formed substantially flat for said predetermined length whereby they are suitable for commutation purposes.

5. In a dynamoelectric machine, a cylindrical rotatable armature member having substantially axially extending slots formed adjacent its surface, a pair of coils supported in each of said slots, said coils being superimposed on each other radially and each being formed of a conductor of substantially rectangular bar stock, said member being arranged to have a section of decreased radius substantially equal to the bottom radius of said slots for a predetermined axial length intermediate its ends thereby to provide radial support for said conductors over said predetermined axial length, the outer surface of each outer coil being formed substantially flat whereby it is suitable for commutation purposes.

6. In a dynamoelectric machine, a cylindrical rotatable armature member having substantially axially extending slots formed adjacent its surface, coils supported in said slots and formed respectively of conductors of substantially rectangular bar stock, said member being arranged to have a section of decreased radius for a predetermined axial length intermediate its ends so that at least the outer surfaces of said conductors are radially beyond said member for said predetermined length, said surfaces being formed substantially flat for said predetermined length whereby they are suitable for commutation purposes, and U-shaped clip members formed of the same conductive material as said conductors respectively embracing and integrally joined to said conductors in said predetermined length and positioned with the tops of the legs of said clips forming extensions of said surfaces respectively.

7. In a dynamoelectric machine, a cylindrical rotatable armature member having substantially axially extending slots formed adjacent its surface, coils supported in said slots and formed respectively of conductors of copper bar stock of substantially rectangular cross section radially superimposed in said slots, said member being arranged to have a section of decreased radius for a predetermined axial length intermediate its ends substantially equal to the radius of the bottom of said slots thereby to provide radial support for said conductors, the outer surfaces of the outer coils being formed substantially flat for said predetermined length whereby they are suitable for commutation purposes, and U-shaped clip members of copper respectively embracing and brazed to the outer conductors in said predetermined length of said member and positioned with the tops of the legs of said clips respectively integral with and in the same planes as said outer coil surfaces.

8. In a dynamoelectric machine, a cylindrical rotatable armature member having substantially axially extending slots formed adjacent its surface, coils supported in said slots and arranged in radially superimposed relation to each other, said coils being respectively formed of conductors of substantially rectangular bar stock, said member being arranged to have a section of decreased radius for a predetermined axial length intermediate its ends substantially equal to the radius of the bottom of said slots so that said member supports said conductors over said predetermined axial length, the outer surface of each outer conductor being formed substantially flat for said predetermined length so that it is suitable for commutation purposes, the inner surface of said outer conductor being notched over at least a part of said predetermined length of said member, and U-shaped clip members formed of the same conductive material as said conductors respectively integrally joined to said outer conductors in said predetermined length of said armature member, each said clip being positioned with the bight thereof arranged within the notch of the conductor with which it is associated and with the tops of the legs thereof integral with and in the same plane as the outer surface of the outer conductor.

9. In a dynamoelectric machine, a cylindrical rotatable armature member having substantially axially extending slots formed adjacent its surface, a pair of coils supported in each of said slots in radially superimposed relation, said coils being respectively formed of conductors of substantially rectangular copper bar stock, said member being arranged to have a section of decreased radius for a predetermined axial lentgh intermediate its ends substantially equal to the radius of the bottom of said slots whereby said member provides radial support to said conductors over said predetermined axial length, each outer conductor having its outer surface formed substantially flat whereby it is suitable for commutation purposes, each outer conductor having its inner surface notched for at least a part of said predetermined axial length, and U-shaped clip members of copper respectively brazed to said outer conductors in said predetermined length of said armature member, each said clip being positioned with the bight thereof extending through said notch and with the tops of the legs thereof integral with and in the same plane as the outer surface of the outer conductor.

10. In a dynamoelectric machine, a cylindrical rotatable armature member having substantially axially extending slots formed adjacent its surface, a pair of coils supported in each of said slots in radially superimposed relation, said coils being respectively formed of conductors of substantially rectangular copper bar stock, said member being arranged to have a section of decreased radius for a predetermined axial length intermediate its ends substantially equal to the radius of the bottom of said slots thereby to provide radial support for said conductors, the outer surface of each outer conductor being formed substantially flat whereby it is suitable for commutation purposes, said coils being formed of individual lengths of stock arranged in abutting relation at a point in said predetermined length of said member, each of said individual lengths of stock forming said outer conductors having its inner surface notched at the abutting ends, and U-shaped clip members of copper positioned with the bight of each clip extending through the notches of abutting ends and with the tops of the legs thereof integral with and in the same plane as the outer surface of the outer conductor with which it is associated, each clip member being brazed to the two lengths of stock forming the outer conductor within a slot, each two pieces of stock having their abutting ends brazed together so as to form a single conductor.

11. A dynamoelectric machine comprising: a stator core member having a plurality of circumferentially spaced pole pieces defining a bore, each said pole pieces being formed of two axially separated portions; a cylindrical rotatable armature member positioned in said stator core member bore, said armature member having a pair of spaced-apart end portions respectively in alignment and defining air gaps with said pole piece portions and having axially extending winding slots formed therein; an armature winding positioned in said slots; the portion of said armature member intermediate said end portions having a smaller diameter than said end portions thereby exposing at least the outer surface of said winding; and commutator brushes disposed in a plane intermediate said pole piece portions and contacting said exposed portion of said winding.

References Cited in the file of this patent

UNITED STATES PATENTS

| | | |
|---|---|---|
| 529,085 | Scott | Nov. 13, 1894 |
| 664,247 | Entz | Dec. 18, 1900 |
| 1,738,166 | Apple | Dec. 3, 1929 |

FOREIGN PATENTS

| | | |
|---|---|---|
| 256,045 | Great Britain | Aug. 5, 1926 |
| 466,936 | Great Britain | June 8, 1937 |